US009004862B2

(12) United States Patent
Miranda

(10) Patent No.: US 9,004,862 B2
(45) Date of Patent: Apr. 14, 2015

(54) CALIBRATION OF WIND TURBINE SENSOR

(71) Applicant: Vestas Wind Systems A/S, Aarhus N (DK)

(72) Inventor: Erik Carl Lehnskov Miranda, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 156 days.

(21) Appl. No.: 13/728,351

(22) Filed: Dec. 27, 2012

(65) Prior Publication Data

US 2013/0121825 A1 May 16, 2013

Related U.S. Application Data

(63) Continuation of application No. PCT/DK2011/050239, filed on Jun. 27, 2011.

(60) Provisional application No. 61/359,617, filed on Jun. 29, 2010.

(30) Foreign Application Priority Data

Jun. 29, 2010 (DK) .................................. 2010 70296

(51) Int. Cl.
  *F03D 11/00* (2006.01)
  *F03D 11/04* (2006.01)
  (Continued)

(52) U.S. Cl.
  CPC .............. *F03D 7/042* (2013.01); *F03D 7/0224* (2013.01); *F03D 11/0091* (2013.01);
  (Continued)

(58) Field of Classification Search
  USPC ......... 416/1, 61, 31, 37; 290/44, 55; 702/104; 73/1.08, 1.11, 1.15, 1.37, 1.38, 1.41, 73/1.75, 1.79, 1.81, 1.82
  See application file for complete search history.

(56) References Cited

U.S. PATENT DOCUMENTS

2006/0086172 A1\* 4/2006 Lee et al. ..................... 73/1.88
2008/0159863 A1\* 7/2008 Uphues .......................... 416/1
(Continued)

FOREIGN PATENT DOCUMENTS

EP   0995904 A2   4/2000
EP   1359321 A1   11/2003
(Continued)

OTHER PUBLICATIONS

Danish Patent and Trademark Office Search Report dated Feb. 1, 2011 for DK application No. PA 2010 70296.
(Continued)

*Primary Examiner* — Christopher Verdier
(74) *Attorney, Agent, or Firm* — Patterson & Sheridan, LLP

(57) ABSTRACT

A control system for calibrating a wind turbine sensor placed on a component of a wind turbine and related methods are disclosed. The wind turbine includes a rotor having at least one wind turbine blade. The method comprises pitching one or more of the at least one of the wind turbine blades according to a predetermined pitch movement which induces a vibratory motion in the at least one turbine blade. A wind turbine sensor measures a vibratory response signal at least partly caused by the vibratory motion. A characteristic sensor response value is determined from the vibratory response signal. The characteristic sensor response value may be compared to a predetermined sensor calibration parameter to determine whether a difference is greater than a predefined tolerance parameter. In this manner, the wind turbine sensor may be calibrated.

20 Claims, 4 Drawing Sheets

(51) Int. Cl.
*F03D 7/04* (2006.01)
*F03D 7/02* (2006.01)

(52) U.S. Cl.
CPC ...... *F05B 2260/98* (2013.01); *F05B 2270/328* (2013.01); *F05B 2270/802* (2013.01); *Y02E 10/723* (2013.01); *Y02E 10/722* (2013.01)

(56) References Cited

U.S. PATENT DOCUMENTS

2008/0307853 A1* 12/2008 Siebers et al. .................. 73/1.29
2009/0263246 A1   10/2009 Bolz
2011/0135474 A1*  6/2011 Thulke et al. .................. 416/61
2011/0285129 A1* 11/2011 Li et al. ......................... 290/44

FOREIGN PATENT DOCUMENTS

| ES | 2343097 A1 | 7/2010 |
| GB | 2459726 A | 11/2009 |
| WO | WO-2008/014935 A2 * | 2/2008 |
| WO | 2009059606 A2 | 5/2009 |

OTHER PUBLICATIONS

PCT International Search Report and Written Opinion dated Apr. 5, 2012 for International Application No. PCT/DK2011/050239, 9 pages.

* cited by examiner

CALIBRATION OF WIND TURBINE SENSOR

CROSS-REFERENCE TO RELATED APPLICATIONS

This application is a continuation of co-pending PCT patent application No. PCT/DK2011/050239, filed Jun. 27, 2011, which claims the benefit of Danish patent application serial number PA 2010 70296, filed Jun. 29, 2010 and U.S. provisional patent application Ser. No. 61/359,617, filed Jun. 29, 2010. Each of the aforementioned related patent applications is herein incorporated by reference in its entirety.

FIELD OF THE INVENTION

The present invention relates to a method for calibrating a wind turbine sensor placed on a component of a wind turbine, the wind turbine comprising a rotor with at least one pitchable wind turbine blade. The invention furthermore relates to a control system for a wind turbine and a wind turbine comprising such control system configured to calibrate a wind turbine sensor.

BACKGROUND

Most modern wind turbines are controlled and regulated continuously with the purpose of ensuring maximum power extraction from the wind under the current wind and weather, while at the same time ensuring that the loads on the different components of the wind turbine are at any time kept within acceptable limits. Desirably, the wind turbine may also be controlled to account for fast local variations in the wind velocity—the so-called wind gusts, and take into account the dynamic changes in the loads on the individual blades due to e.g. the blade passing of the tower or the actual wind velocity varying with the distance to the ground (the wind profile).

To this purpose most modern wind turbines comprise a number of sensors placed on different wind turbine components such as e.g. on the blades, the nacelle, the hub, the foundation, or on the tower. The parameters measured by these sensors are collected and monitored by the wind turbine controllers and following some control strategy the optimal control parameters of the turbine in order to perform optimally under the given conditions are determined. The methods of controlling the current performance, and thereby the power production and the load situation of the wind turbine, include for instance pitching of the blades, adjusting any other active aerodynamic devices for changing the aerodynamic surfaces of the blades such as flaps or vortex generating means, adjusting the power, and/or adjusting the rotational speed of the rotor. The parameters measured by the different wind turbine sensors may for instance include the current wind speed and direction, the wind shear and turbulence, the rotational speed of the rotor or the generator, the pitch angle of each blade, the yaw angle, accelerations, stresses or vibrations, and may be measured by sensors such as accelerometer, anemometers, strain gauges, optical fibres etc.

As the sensor measurements play an important role in the control of the wind turbines and thereby directly or indirectly influence the loading on the different wind turbine parts or e.g. the energy production, the accuracy and general performance of the sensors is correspondingly important. However, most often there is no regular calibration or maintenance of the sensors. Further, manual calibration and inspection may require a service team on site which is both very expensive, time consuming, and difficult to administrate.

DESCRIPTION OF THE INVENTION

It is therefore an object of embodiments of the present invention to overcome or at least reduce some or all of the above described disadvantages of the known technology by providing an efficient method for the calibration of wind turbine sensors which does not require manual inspection.

It is a further object of embodiments of the invention to provide a method for the calibration of wind turbine sensors which may by performed automatically.

In accordance with the invention this is obtained by a method for calibrating a wind turbine sensor placed on a component of a wind turbine, the wind turbine having a rotor with at least one pitchable wind turbine blade, the method comprising the steps of pitching at time intervals the at least one blade according to a predetermined pitch movement and detecting at time intervals a response signal from the wind turbine sensor at least partly caused by said predetermined pitch movement. Further, the method comprises determining a characteristic sensor response value as a function of the at least one detected response signal, and determining the difference between the characteristic sensor response value and a predetermined sensor calibration parameter. The wind turbine sensor is calibrated according to the determined characteristic sensor response value in case the difference is above a predefined tolerance parameter.

A method to detect whether calibration of a wind turbine sensor is needed and to perform the calibration in a simple yet effective and very precise manner is hereby obtained. The method is advantageous in that it may be performed automatically and may reduce or remove the need for regular calibration and service of the wind turbine sensor. As conventional sensor calibration otherwise typically imply a certain part of manual calibration requiring a service team on site and stand still of the turbine, the calibration method according to the present invention may reduce the costs of maintenance of the wind turbine considerably.

Further a method for the calibration and detection of critical faults in a wind turbine sensor such as an accelerometer in the entire life time of the turbine is hereby obtained.

The method is simple and fast to apply and yet effective. Further the method according to the invention may be implemented on existing wind turbine. As the calibration method may be implemented by pure software implementation, no additional hardware is needed on the wind turbine which renders the method further economically advantageous.

The wind turbine sensor may comprise an accelerometer, anemometer, strain gauge, fiber optics, position sensors or the like. The wind turbine sensors may be placed on any or more of the wind turbine components such as on one or more of the blades (e.g. in the blade root or in the blade tip), the tower, the foundation, on the main shaft, in the nacelle, the hub, or in the gears.

The blades may be pitched collectively or individually, or as a combination hereof. The predetermined pitch movement may comprise changing the blade pitch angle of the one or more blades according to any predetermined function of time such as e.g. linearly, piecewise linearly, exponentially, or sinusoidal. The blades may be pitched according to the same or different functions. The pitch movement may comprise changing the pitch of the one or more blades in one direction only or in both directions. The pitch movement may be performed at regular or irregular time intervals.

In an embodiment, the time intervals are predetermined, so that the pitch movement may be performed for instance every day, every week, a number on times every half year etc.

Alternatively or additionally, the time intervals at which the pitch movement is performed may be a function of or conditioned on other parameters, such at for instance the wind speed, the power production, or the measured tower acceleration, or may be performed on demand.

The pitch movement may advantageously be identical or near identical for each detection of the response signals. However, other circumstances such as variations in the weather conditions or wear in the pitch bearings or valves may cause the resulting pitch movement to vary slightly from the predetermined pitch movement. Such variations may be minimized by using further pitch movements and response signals in the determination of the characteristic sensor response value.

In embodiments of the invention, the characteristic sensor response value may however be determined from a single measurement and a single pitch movement.

The pitch movement causes the wind turbine and its components to deform and deflect and induces vibration, strains and stresses in for instance the blades and the tower. The response signal from the wind turbine sensor under consideration may be detected during or at the same time as the pitch movement, for a time period covering a longer or shorter period of the pitch movement or alternatively or additionally for a time period right after or shortly after the pitch movement.

From this or these response signals is determined a characteristic sensor response value which is a parameter characteristic to the response signal caused by the pitch movement. The characteristic sensor response value may for instance be or be a function of the standard deviation of the sensor signal within a certain time period, the variance, the difference between the maximum and minimum values attained, or a mean value. The response signal may advantageously be filtered to obtain only the excitation frequencies. Other characteristic sensor response values may be chosen depending on the nature of the pitch movement and the expected type of response signal.

The determined characteristic sensor response value is then compared to the so-called sensor calibration parameter which is the expected or desired value of the characteristic sensor response value for that specific pitch movement and as determined beforehand. As discussed in further details later, the sensor calibration parameter may for instance be determined from numerical simulations and/or from initial sensor measurements performed on the same or another wind turbine of the same type.

Calibration of the wind turbine sensor is performed in case the characteristic sensor response value deviates from the predetermined sensor calibration parameter by more than a predetermined tolerance parameter. The calibration may be performed according to the determined characteristic sensor response value and may be performed automatically and purely by means of software.

In an embodiment of the invention, an alert parameter may be set if the determined characteristic sensor response value is outside the tolerance band by more than some factor, and/or in case of repeating drifting by the sensor. A set or activated alert parameter may be used to draw the attention to the apparent need of replacing or repairing the wind turbine sensor in an automatic way minimizing the need for manual inspection or control.

Further, by keeping count on the alert parameter, the controller software may supervise how many times a wind turbine sensor such as e.g. an accelerometer has been calibrated automatically with a view to ensure that it does not happen too often or as a means of quality feed-back.

In an embodiment of the invention the same pitch movement is used in the calibration of more than one sensor of the same or different types.

In an embodiment of the invention, the characteristic sensor response value is determined as a function of a number of detected response signals from a number of pitch movements. In this way the potential calibration may be determined based on a number of measurements by the wind turbine sensor which may be collected over a shorter or longer period of time. Therefore the characteristic sensor response value may be determined with a higher degree of accuracy in that potential variations in the response signals due to other parameters than the predetermined pitch movement such as variations in wind conditions, temperature etc may be minimized. In an embodiment some response signals may be discarded and not used in the determination of the characteristic sensor response value for instance based on the assessment that the response signals deviate significantly from the others or if the response signal originates from a measurement performed under unacceptable conditions, i.e. at too high wind speeds etc.

In an embodiment the characteristic sensor response value is determined as a function of the standard deviation and/or of the maximum variation of the at least one response signal. These parameters have been found to advantageous in determining a characteristic yet robust measure for the sensor as caused by the pitch movement.

In a further embodiment of the invention the characteristic sensor response value is determined as a function of the mean value of the standard deviations of the number of response signals. Numerical simulations and test data has shown that the mean value of the standard deviation of the sensor responses provides a robust measure characteristic for the sensor. This characteristic response value further has been found only to depend minimally on variations on the accuracy of the pitch movement, for instance to slight variations in the pitch or the pitch rate during the movement.

The characteristic sensor response value may according to a further embodiment be determined as a function of a confidence interval of the number of response signals, where the confidence interval yields an estimated range of values which is likely to include the characteristic sensor value, and where the estimated range is calculated from a given set of sensor data.

The determining of the characteristic sensor response value according to any of the functions mentioned above is advantageous in that these quality measures may in a reliable way quantify if a suggested calibration is significant or rather caused by statistical variance.

According to an embodiment of the invention, the predetermined sensor calibration parameter is determined at least partly from numerical simulations which may be advantageous in that the sensor calibration parameter may be determined beforehand for each series of wind turbines and wind turbine sensors prior to erecting the wind turbine. Further, the numerical simulations may be advantageous in determining a pitch movement (for example for the pitch lubrication pitch) which may yield robust yet accurate characteristic sensor response values.

Alternatively or additionally, the predetermined sensor calibration parameter may be determined at least partly from an initial set of measurements performed on the same or another wind turbine. Hereby numerical simulations may be obviated. Further, it is hereby possible to determine the sensor calibration parameter on the actual wind turbine sensor and on the actual wind turbine and thereby under the actual site conditions as the sensor is supposed to work.

In an embodiment of the invention, the step of detecting the response signal from the wind turbine sensor comprises measuring an acceleration of the wind turbine tower over a period of time. Hereby the disclosed calibration method may advantageously be used in the calibration of the accelerometers on the wind turbine. The accelerations of e.g. the nacelle or the tower are often very important parameters in determining the optimal control for the wind turbine. Therefore the accuracy and exactness of the accelerometer are likewise correspondingly important. Furthermore, it has been established through simulations that the disclosed calibration method may provide for very accurate and reliable calibration of accelerometers. Specifically, a strong correlation has been demonstrated between the standard deviation of measured tower acceleration signals and the pitch and pitch rate of a pitch movement.

According to an embodiment of the invention, the calibration of the wind turbine sensor may be performed during operation of the wind turbine. Hence the time of non production of the wind turbine may be minimized.

In an embodiment of the invention, the calibration of the wind turbine sensor may be performed before connecting the wind turbine to an electrical grid e.g. during idling. Hereby the pitch movement used for detecting the sensor responses for the calibration may not interfere with the normal control of the wind turbine. Further, the power production may be not be affected by the calibration method.

In an embodiment of the invention, the pitch movement comprises an initial period of a constant pitch, such as for example a zero pitch. Accordingly an oscillation of the wind turbine tower or other of the wind turbine components may decrease or fade whereby the effects of any prior pitching and/or wind conditions may be minimized. The response signal detected from this initial period may then optionally be disregarded and not used in determining the characteristic sensor response value.

Alternatively or additionally, the pitch movement comprises pitching the at least one blade according to a sinusoidal function in time and/or pitching the at least one blade a first angle of rotation the one way followed by a second angle of rotation the other way. Such pitch movements have shown to result in or cause corresponding characteristic sensor responses which may advantageously form basis for determining a characteristic sensor response value.

The first angle of rotation may comprise an angle within the interval of [−5; 0] degrees and within the interval of [−3; 0] degrees in a more specific embodiment. The second angle of rotation may comprise an angle within the interval of [0; 10] degrees and within the interval of [0; 5] degrees in a more specific embodiment. Alternatively, the order of the pitch rotation may be inversed.

In an embodiment of the invention the pitch movement may comprise a pitch lubrication movement. Such pitch lubrication movement could as an example comprise the above mentioned pitch patterns of a sinusoidal and/or pitching the at least one blade a first angle of rotation the one way followed by a second angle of rotation the other way. Most modern wind turbines pitch the blades according to some pitch lubrication movement at times of little or no other pitch in order to ensure that the pitch systems stay lubricated. By using such pitch lubrication movement in the calibration of the wind turbine sensor(s) no additional pitch activity is necessary as the pitch lubrication algorithm which already is activated provides the necessary, deterministic pitch movement.

In a further embodiment of the invention an alert parameter is set when the sensor has been calibrated a predefined number of times. The alert parameter may for instance trigger that further monitoring or testing of the wind turbine sensor is performed with the view to determine to a greater degree of certainty if the sensor needs maintenance or should be renewed. An alert parameter may likewise be set in case the characteristic sensor response value deviates more than a certain value from the calibration parameter.

In an embodiment of the invention, the pitching according to the predetermined pitch movement is performed when the wind speed is below a predefined level and/or when a measured acceleration of the nacelle or tower is below the same or another predefined level. Accordingly the pitch movement is initiated under calm wind conditions where the wind turbine tower is most likely only oscillating minimally or moderately. In this way the obtained measurements from the wind turbine sensors may reflect the pitch movement more accurately.

According to another aspect, the invention relates to a control system for a wind turbine configured for performing the calibration method described previously and for a wind turbine comprising a rotor with at least one pitchable wind turbine blade and a wind turbine sensor placed on a component of a wind turbine. The control system may be configured to perform the steps of pitching at time intervals the at least one blade according to a predetermined pitch movement, detecting at time intervals a response signal from the wind turbine sensor at least partly caused by the predetermined pitch movement, and determining a characteristic sensor response value as a function of the at least one detected response signal. The control system is further configured for determining the difference between the characteristic sensor response value and a predetermined sensor calibration parameter, and calibrating the wind turbine sensor according to the determined characteristic sensor response value in case the difference is above a predefined tolerance parameter. The advantages of the control system are as described previously in relation to the calibration method.

According to a yet another aspect, the invention relates to a wind turbine comprising such control system as above. The wind turbine comprises a rotor with at least one pitchable wind turbine blade and a pitch controller for pitching at time intervals the at least one blade according to a predetermined pitch movement. The wind turbine further comprises a wind turbine sensor placed on a component of a wind turbine, the sensor being placed such as to measure at time intervals a response signal at least partly caused by the predetermined pitch movement. The wind turbine further comprises a processor for determining a characteristic sensor response value as a function of the at least one response signal, determining the difference between the characteristic sensor response value and a predetermined sensor calibration parameter, and calibrating the wind turbine sensor according to the determined characteristic sensor response value in case the difference is above a predefined tolerance parameter. The advantages hereof are as described previously in relation to the calibration method.

BRIEF DESCRIPTION OF THE DRAWINGS

In the following different embodiments of the invention will be described with reference to the drawings, wherein.

DETAILED DESCRIPTION OF THE DRAWINGS

Figure 1:
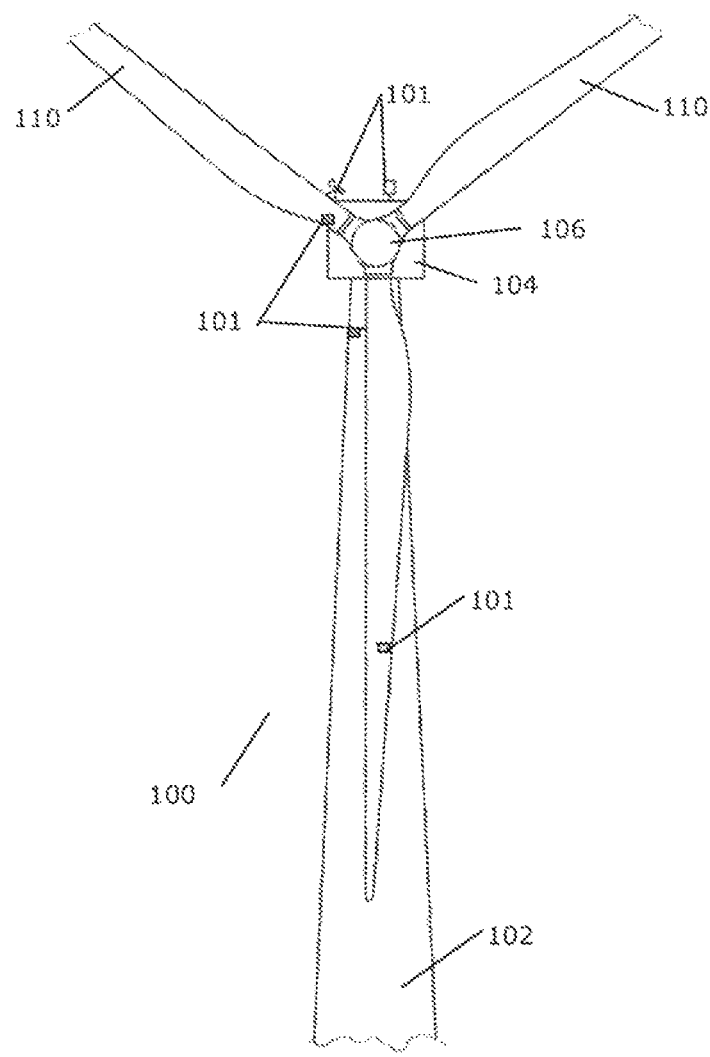
FIG. 1 generally illustrates a wind turbine and a general control system of a wind turbine according to the present invention.

As shown in FIG. 1, a wind turbine 100 comprises a tower 102, a nacelle 104 at the tower top, the nacelle housing machine components, such as gearbox, generator etc. (not shown). At one end of the nacelle, a hub section 106 supports a plurality of wind turbine blades 110. The rotor of the wind turbine includes the blades and possibly other rotating parts. One or more sensors 101 may be provided in or on a wind turbine component such as e.g. the hub section 106, in or on the nacelle 104, in one or more of the blades 110, in the tower 102, or on the wind turbine foundation (not shown). The sensor(s) 102 is/are arranged to measure one or more operational parameters on the wind turbine rotor exerted by the wind, such as an acceleration of a component of the wind turbine, a load of a component of the wind turbine, a deflection of a component of the wind turbine, or a rotational speed of a component of the wind turbine. The load measurement may e.g. be a torque measurement at the hub or a stress in the blade root and carried out by suitable means, such as strain gauges, optical fibres etc. The acceleration measurement may be performed by means of an accelerometer arranged within the hub section, on the nacelle, on the tower, or on the main shaft. The deflection measurement may be performed e.g. by an angle measurement device. The rpm measurement may conveniently be a performed on the main shaft of the turbine or on a rotatable part within the hub section, to measure the rotational speed of the rotor. Alternatively, it may be performed by an instrument, which is independent of access to the main shaft of the wind turbine.

The wind turbine may comprise one or more controllers such as e.g. a nacelle-housed controller within the nacelle and a hub-sided controller and in communication with each other via an interface between the stationary and the rotating parts. The controllers receive input from the set of sensors or measuring units 101 placed on different components of the wind turbine such as in the nacelle, in the blades or the tower. The sensors 101 may provide input data to the one or more controllers for further data processing. The sensors 101 may be provided for individual purposes, or some of them may replicate others. For example, two of the sensors 101 may be provided for measuring blade load, whereby one of the sensors 102 is provided to take over if the other fails. The control system comprises a pitch controller for determining the pitch reference value and for controlling the pitch of the blades 110 collectively or individually according to such pitch reference value or according to any predetermined pitch movement. The response signals from the sensors 101 are processed in a processor in one or more of the controllers to yield the characteristic sensor response value of one or more of the sensors and to compare this to the predetermined sensor calibration parameter for that respective sensor(s). In case the characteristic sensor response value determined from the response signal deviates too much from the predetermined sensor calibration parameter the sensor is then calibrated correspondingly.

Figure 2:
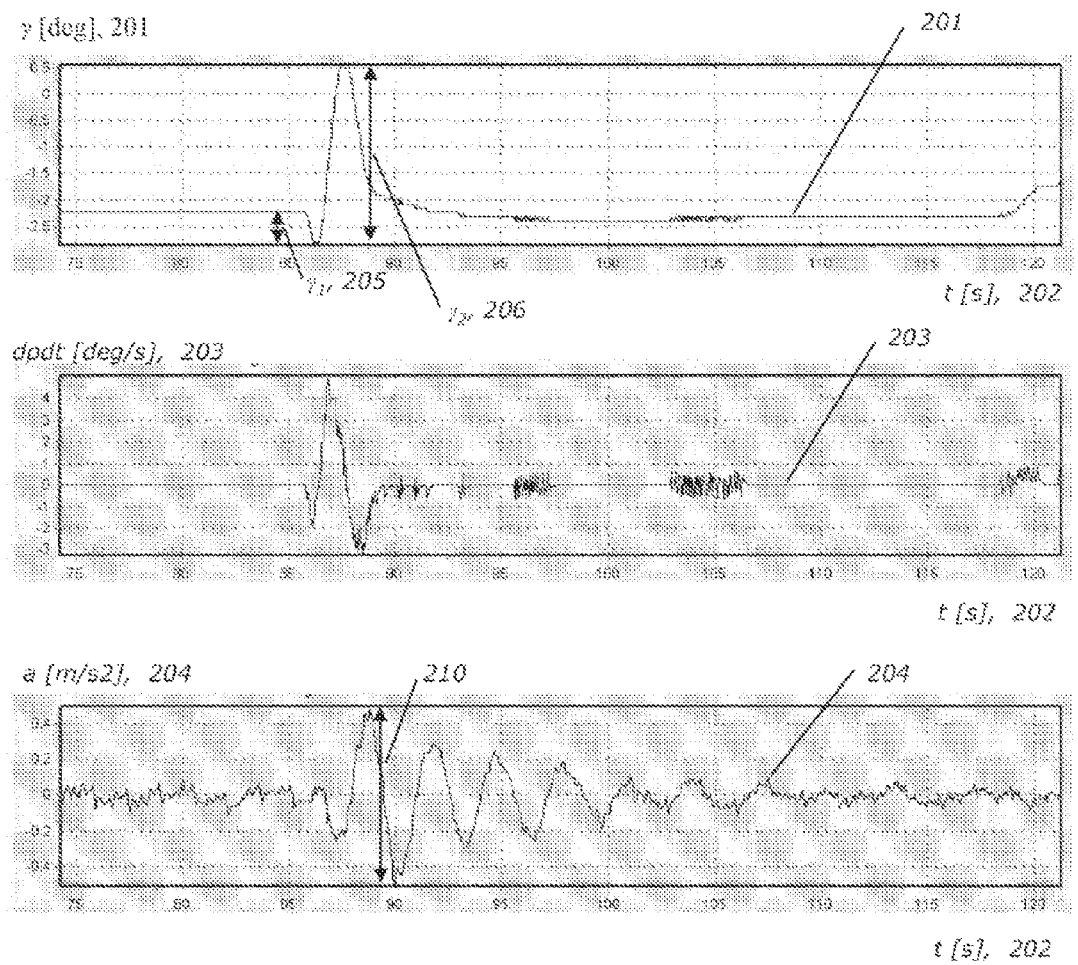
FIG. 2 illustrates a blade pitch movement, the pitch rate, and the measured tower acceleration during pitch lubrication of a blade.

FIG. 2 shows a measured time series for a turbine performing a pitch lubrication motion. The uppermost curve 201 shows the pitch movement as illustrated by the pitch angle $\gamma$ as a function of time t, 202. The middle curve 203 shows the resulting pitch rate $\rho$, whereas the lowermost curve 204 shows the detected response signal from a wind turbine sensor, which in this case is an accelerometer on the wind turbine tower measuring the tower acceleration a 204 downwind. The pitch lubrication movement in this specific example comprises pitching the blades collectively a first angle of rotation $\gamma_1$ 205 of approximately $\gamma_1=0.5°$ the one way followed by pitching the blades a second angle of rotation $\gamma_2$ 206 of approximately $\gamma_2=3.5°$ the other way. As can be seen from the figure, the pitch movement excites vibrations in the tower. In one embodiment of the invention the difference between the maximum and the minimum response value $\Delta a$ 210 in the response signal 204 is taken as a characteristic measure for the sensor and a characteristic sensor response value. In case this determined characteristic sensor response value deviates from the predefined sensor calibration parameter by more than a tolerance parameter the sensor needs calibration and is calibrated according to the determined characteristic sensor response value.

Figure 3:
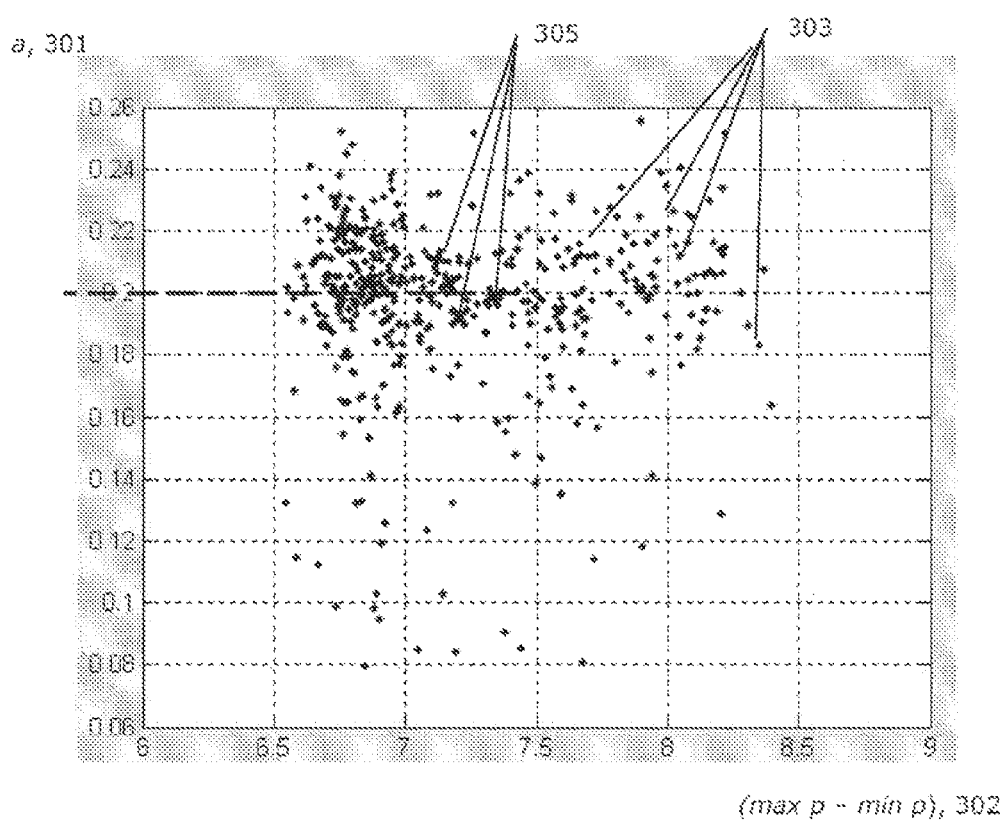
FIG. 3 illustrates the standard deviation of the tower acceleration as a function of the pitch rate for a number of separate and grouped pitch movements.

In another embodiment the characteristic sensor response value is determined from more measurements and from more than one detected response signal based on the same or nearly the same pitch movement. In FIG. 3 is illustrated the standard deviation of the tower acceleration a 301 as a function of the max-min pitch rate (max p−min p) 302 during the pitch lubrication movement (PLM) as shown in FIG. 2 and shown with the dots 303 for nearly 500 measurements.

The crosses 305 show the same results after having grouped the data being in groups of 20 PLM sequences. From this it is clear that the tower acceleration a is strongly correlated with the pitch rate and thereby yields a characteristic sensor response value for this pitch movement, see the crosses 305.

The turbine typically performs a pitch lubrication movement each 20-30 minutes under calm wind conditions e.g. when the wind speed or the measured acceleration is below certain limits. Hence a number of measurements such as e.g. 10-30 can be collected within a couple of days which is more than sufficient since sensor calibration may reasonably be estimated to be necessary only with ½-1 year intervals. In this way, even if the wind speed increases which means that the turbine does not perform a pitch lubrication movement, there is plenty of time to wait for low wind speed to collect more PLM data based upon which the sensor may be calibrated is necessary.

From the FIG. 3 it appears that the tower accelerometer signal must show 0.20 m/s2±some tolerance of for instance 0.02. If the characteristic sensor response value is slightly outside the tolerance band the sensor can easily be calibrated automatically by the software automatically adding the difference to all future sensor signal values. If the characteristic value is far outside the tolerance band or on repeating drifting by the sensor an alert can be set drawing the attention to the apparent need of replacing or fixing the sensor. In this way the controller software can supervise how many times a sensor such as the accelerometer in the present case has been calibrated automatically to ensure that it does not happen too often.

Of course the tower acceleration response depends on which PLM strategy is chosen. Moreover it depends on the tower height and turbine type. The acceptable accelerometer response band must therefore be chosen depending of these factors like all other supervision and control parameters.

Figure 4:
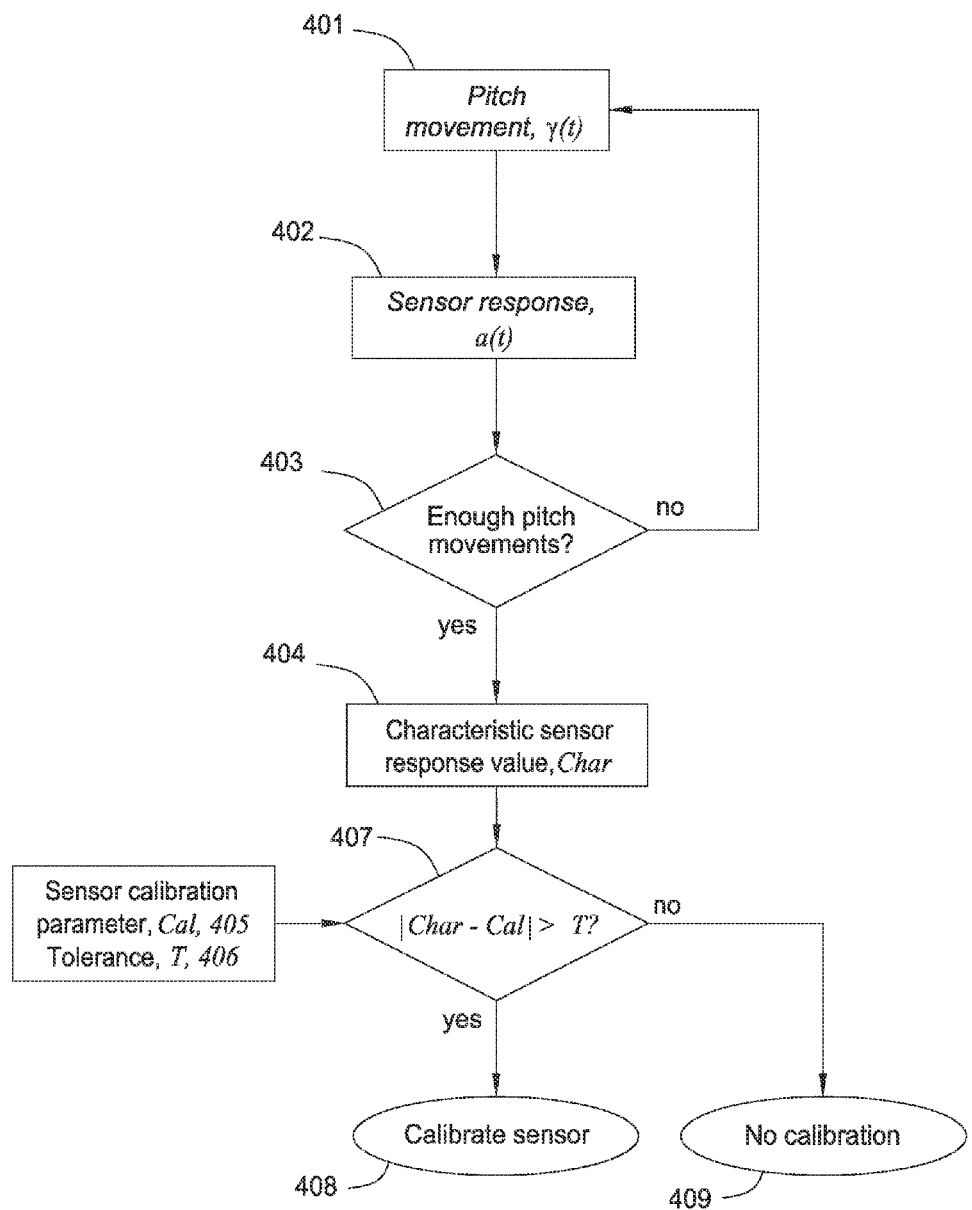
FIG. 4 is a flow-chart illustrating an embodiment of the control method.

FIG. 4 is a flow-chart illustrating an embodiment of the control method according to the invention. At time intervals one or more of the wind turbine blades are pitched according to some predetermined pitch movement $\gamma(t)$ (pitch as a function of time t) 401. As previously described the pitch movement may for instance be a pitch lubrication movement and/or a sinusoidal function in time. A sensor response signal 402 and resulting from the pitch movement is then measured, such as e.g. the downwind acceleration of the tower a(t) as measured by an accelerometer on the tower. A number 403 of sensor responses based on a corresponding number of pitch movements may be collected and processed before a characteristic sensor response value Char, 404 is determined. Alternatively the characteristic sensor response value may be determined from a single pitch movement and a single detected response signal. The detected sensor response from step 402 may be filtered to get the excitation frequencies or by a high pass filter in order to derive the high frequency content of the sensor signal. The characteristic sensor response value may for instance be the, or may be determined as the mean value of the standard deviation or variance values of a group of detected sensor signals. The determined characteristic sensor response value Char is then in the step 407 compared to the predetermined calibration parameter of the sensor Cal 405 expressing what the characteristic sensor response value Char should desirably be. In case the difference between said to sensor parameters is larger than a certain predefined tolerance parameter T 406, the sensor is calibrated accordingly, 408. Otherwise no sensor calibration is necessary, 409.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method for calibrating a wind turbine sensor placed on a component of a wind turbine, the wind turbine having a rotor with at least one wind turbine blade, the method comprising:
    pitching, at time intervals, the at least one wind turbine blade according to a predetermined pitch movement which induces a vibratory motion of the at least one wind turbine blade;
    detecting at least one vibratory response signal from the wind turbine sensor at least partly caused by the vibratory motion;
    determining a characteristic sensor response value as a function of the at least one vibratory response signal;
    determining a difference between the characteristic sensor response value and a predetermined sensor calibration parameter; and
    calibrating the wind turbine sensor according to the determined characteristic sensor response value in case the difference is greater than a predefined tolerance parameter.

2. The method of claim 1, wherein the characteristic sensor response value is determined as a function of a number of the at least one vibratory response signal from a number of the predetermined pitch movements.

3. The method of claim 1, wherein the characteristic sensor response value is determined as a function of a standard deviation of the at least one vibratory response signal.

4. The method of claim 1, wherein the characteristic sensor response value is determined as a function of a maximum variation of the at least one vibratory response signal.

5. The method of claim 4, wherein the characteristic sensor response value is determined as a function of a mean value of standard deviations of the at least one vibratory response signal.

6. The method of claim 5, wherein the characteristic sensor response value is determined as a function of a confidence interval of a number of the at least one vibratory response signal.

7. The method of claim 1, wherein the predetermined sensor calibration parameter is determined at least partly from numerical simulations.

8. The method of claim 1, wherein the predetermined sensor calibration parameter is determined at least partly from an initial set of measurements performed on the same or another wind turbine.

9. The method of claim 1, wherein the detecting the at least one vibratory response signal from the wind turbine sensor comprises measuring an acceleration of a wind turbine tower over a period of time.

10. The method of claim 1, wherein the calibration of the wind turbine sensor is performed during operation of the wind turbine.

11. The method of claim 1, wherein the calibration of the wind turbine sensor is performed before connecting the wind turbine to an electrical grid.

12. The method of claim 1, wherein the predetermined pitch movement comprises an initial period of a constant pitch.

13. The method of claim 1, wherein the pitch movement comprises pitching the at least one wind turbine blade according to a sinusoidal function in time.

14. The method of claim 1, wherein the predetermined pitch movement comprises a pitch lubrication movement.

15. The method of claim 1, wherein the pitch movement comprises pitching the at least one wind turbine blade to a first angle using a first rotation followed by pitching to a second angle using a second rotation, wherein the second rotation is directed opposite the first rotation.

16. The method of claim 1, wherein an alert parameter is set when the wind turbine sensor has been calibrated a predefined number of times.

17. The method of claim 1, wherein the pitching according to the predetermined pitch movement is performed when a wind speed is below a predefined level.

18. The method of claim 1, wherein the pitching according to the predetermined pitch movement is performed when a measured acceleration of a nacelle or a tower is below a predefined level.

19. A control system for a wind turbine having a rotor with at least one wind turbine blade and a wind turbine sensor placed on a component of the wind turbine, the control system configured to:
    pitch, at time intervals, the at least one blade according to a predetermined pitch movement which induces a vibratory motion of the at least one wind turbine blade;
    detect at least one vibratory response signal from the wind turbine sensor at least partly caused by the vibratory motion;
    determine a characteristic sensor response value as a function of the at least one vibratory response signal;
    determine a difference between the characteristic sensor response value and a predetermined sensor calibration parameter; and
    calibrate the wind turbine sensor according to the determined characteristic sensor response value in case the difference is greater than a predefined tolerance parameter.

20. A wind turbine having a rotor with at least one wind turbine blade, the wind turbine comprising a pitch controller for pitching at time intervals the at least one wind turbine blade according to a predetermined pitch movement which induces a vibratory motion of the at least one wind turbine blade, the wind turbine further comprising a sensor placed on a component of the wind turbine, the sensor being configured to measure at least one vibratory response signal at least partly caused by the vibratory motion, the wind turbine further comprising a processor configured to:
- determine a characteristic sensor response value as a function of the at least one vibratory response signal,
- determine a difference between the characteristic sensor response value and a predetermined sensor calibration parameter, and
- calibrate the wind turbine sensor according to the determined characteristic sensor response value in case the difference is greater than a predefined tolerance parameter.

* * * * *